Nov. 19, 1940.  E. C. WHITE  2,221,889
MIRROR SIGN
Filed July 28, 1939
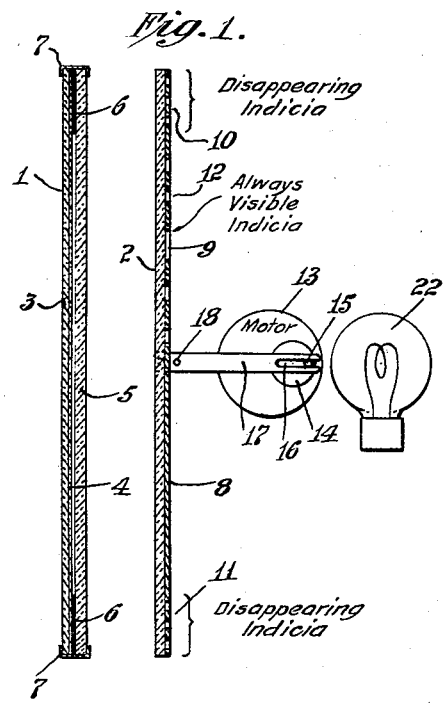
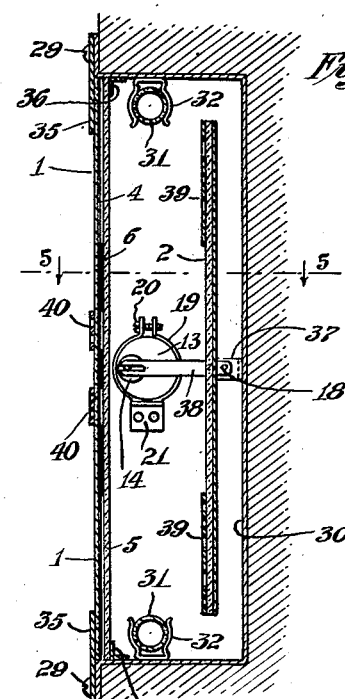
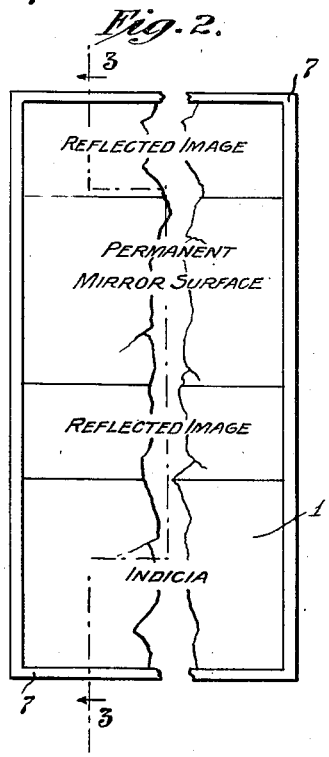
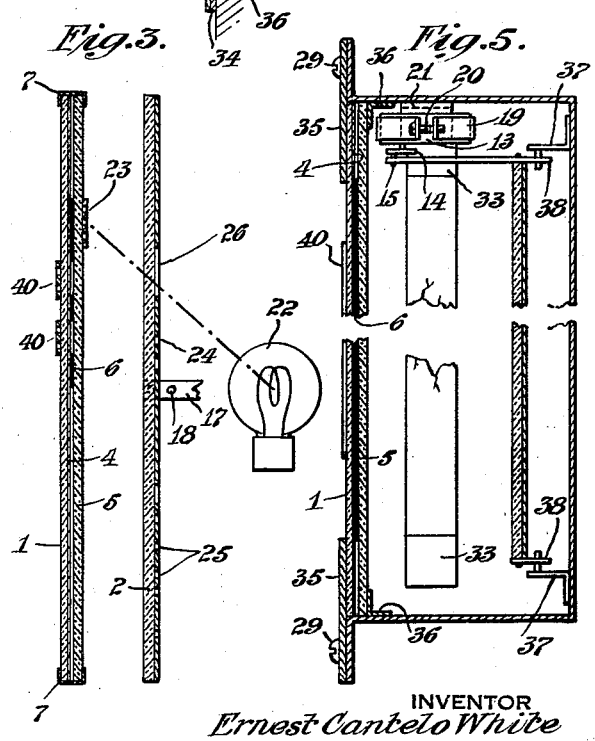
INVENTOR
Ernest Cantelo White
BY
Joseph F. Cobert
ATTORNEY Patented Nov. 19, 1940

2,221,889

UNITED STATES PATENT OFFICE 2,221,889

MIRROR SIGN

Ernest Cantelo White, Bronxville, N. Y., assignor to Multi Vue Signs Company, Incorporated, New York, N. Y., a corporation of New York Application July 28, 1939, Serial No. 287,103

8 Claims. (Cl. 40—130)

The present invention relates to improvements in a mirror sign capable of producing multiple images which appear to move, such as disclosed in U. S. Letters Patent 2,132,472 issued October 11, 1938 to Norman En Holm; and also as disclosed in my copending application Serial No. 281,531 filed June 28, 1939. This effect is produced by an arrangement of a front transparent mirror and a rear opaque mirror, said mirrors having opposed reflecting surfaces, and means for causing the opposed surfaces to assume varying relative angular positions by continuously moving one of said mirrors.

The present application is a companion case to my application filed concurrently herewith and bearing Serial Number 287,101. The subject matter of said application is directed to improvements in mirror signs, either of the animated or inanimate type, adapted to produce multiple images, and consists in interposing an opaque non-transparent surface between the transparent mirror and the opaque mirror, for the purpose of effecting an apparent non-transparent surface on a portion of the transparent mirror, so that the transparent mirror will always have a portion of its surface apparently opaque, whether or not the sign is illuminated.

In another companion case filed concurrently herewith and bearing Serial Number 287,102, I apply this principle to an animated sign in the arrangement of sets of indicia which disappear and reappear alternately, each set in turn producing multiple images which may substantially fill the entire area of the sign. I accomplish this feature by providing an opaque border in cooperative relation to the transparent mirror, which may take the form of making the frame, which holds the transparent mirror in position, wider at the top and bottom, thus covering for an appreciable distance the adjacent edges of the transparent mirror.

The present invention is directed to securing other novel combinations and arrangements of indicia by utilizing the basic features contemplated by the aforesaid applications Serial Numbers 287,101 and 287,102, respectively, in a mirror sign, such as contemplated herein, of the animated type; also to obtaining a novel form of illuminating the indicia, whereby variations and adaptations of the manner in which the indicia are presented, may be resorted to in securing unique advertising effects.

It is an object of the invention to provide a sign of the class described, in which disappearing indicia are combined with constantly visible indicia, the same being accomplished in a very simple, inexpensive and efficient manner.

Another object is to effect a permanent non-transparent surface on a portion of the transparent mirror and interposing said surface with respect to indicia so as to separate the indicia into sets which may be, respectively, constantly visible, disappearing, or severally a combination of both forms.

A special object is the provision of a transparent miror having forwardly and rearwardly reflecting surfaces, and having part of said reflecting surfaces made opaque for the purpose of carrying out a pattern or scheme for effecting any desired arrangement of character and/or appearance of the indicia.

Another object of the invention is the provision of a construction and an arrangement of the mirrors comprising the system so as to permit front lighting of the rear mirror, thus making it possible to obtain an economy of space and novel advertising effects which are not obtainable when the rear mirror is lighted from behind.

Another object is the provision of a mirror system having incorporated therein indicia, which may be closely controlled with respect to the sequence of appearance thereof, and at the same time permit considerable latitude in the location and arrangement of the indicia within predetermined areas of either mirror.

Another object of the invention is to provide permanently visible indicia against a mirror background which is efficiently visible in lighted surroundings whether the illuminating means forming part of the sign are in use or not, combined with the effective presentation of other and animated indicia when the sign is lighted, without permitting the front view of the animated indicia to encroach upon the mirror background of the permanently visible indicia.

A still further object of the invention is the provision of an oscillatory mechanism for one of the mirrors, which mechanism is characterized by simplicity of parts, uniformity of motion imparted to the mirror oscillated thereby, and other apparent advantages.

Other objects, advantages and features of construction, in combination of means and details, will be made manifest from the following specification, and are additional objects of the invention.

In the accompanying drawing:

Fig. 1 is a section, somewhat diagrammatic in character, of the mirrors and certain operative parts therefor, embodied in a sign of the class described;

Fig. 2 is a front elevation of a transparent mirror, illustrating the localizing of various indicia in given portions of the mirror;

Fig. 3 is a sectional view on the line 3—3 of Fig. 2 of the transparent and opaque mirrors comprising the mirror system, showing the location and formation of the indicia to produce the effects represented in Fig. 2;

Fig. 4 is a vertical sectional view of a sign including a built-in cabinet and illustrating means for oscillating the opaque mirror; and Fig. 5 is a horizontal sectional view taken on line 5—5 of Fig. 4.

Referring to the accompanying drawing, more particularly Fig. 1, there is shown a mirror system and a mechanism for oscillating one of the mirrors, it being understood that this apparatus may be enclosed in any suitable casing as illustrated in Figs. 4 and 5. The mirror system includes a front transparent mirror 1 and a rear opaque mirror 2. As it is well known in the art, the transparent mirror comprises a sheet of glass 3, having a thin coating 4 of silver on its rear face, which coating is sufficiently thin to pass transmitted light, but capable of forming a reflecting surface by reflected light. To protect the silver coating on the transparent mirror, it is covered with a sheet of glass 5, which may have an opaque reflecting surface 6 applied to certain areas of its front face. In practice I use an ordinary opaque mirror for the cover glass 5 and remove any portions of the silvering that may be required to obtain the results desired in a given instance. It will therefore be understood that throughout the several views of the drawing, the cover glass 5 is an opaque mirror facing backwards and having all of its reflective and protective backing removed, except for portions which it is desired to utilize for a particular purpose. For example, in Fig. 1 all of the coating 6 of the cover glass 5 has been removed except a marginal strip at the top and bottom thereof, thus leaving the intermediate portion clear. The mirror 1 and its cover glass 5 are bound together, around their marginal edges, with thin adhesive tape 7, thus uniting the same into a unitary structure.

The opaque mirror 2 is provided with a thick silver coating 8 on its rear face which is not transparent to transmitted light and which is preferably covered with a dark colored protective coating. The mirror 2 may be treated in any desired manner to produce indicia visible when illuminated. One well known method of providing the mirror 2 with indicia of this character is by the so-called "silk screen" process, which is employed to remove portions of the silver coating 8, and to apply a transparent or translucent color to the removed or cut out portions 9. As this feature in itself is no part of the present invention, further description thereof is deemed unnecessary. However, the location of the indicia is an important feature of the invention, as it determines the general character of the sign. In the present adaptation of the invention the opaque mirror 2 carries indicia which are constantly visible, and other indicia which are arranged to disappear and reappear upon the oscillation of the mirror 2, these effects being obtained primarily by the arrangement and/or location of the several indicia.

It will be noted that the sets of disappearing indicia 10 and 11 are formed at the top and bottom, respectively, of the transparent mirror 1 do not extend beyond the width of the opaque, non-transparent coating 6, so that normally these indicia are concealed. The indicia 12 formed on the upper half of the mirror 2 come within the clear portion of the cover glass 5 and when the sign is illuminated they are constantly visible from the front. It will be observed that the coating 8 in the lower half of the mirror 2 is undisturbed except for the indicia 11 at the lower marginal edge. This arrangement provides an effective permanent mirror backing for the oppositely disposed corresponding portion of the transparent mirror 1, irrespective of whether or not the sign is illuminated.

To oscillate the mirror 2, I provide a motor 13 which has a disc 14 eccentrically mounted thereon and suitably geared to provide any desired speed of rotation of the disc 14. The disc 14 carries a laterally extending pin 15 adapted to engage a longitudinal slot 16 provided in an arm 17 rigidly secured to the opaque mirror 2. The rotation of the disc 14 causes the pin 15 to reciprocate back and forth in the slot 16, as will be appreciated by those skilled in the art, and this motion is translated to the arm 17 so as to cause the mirror 2 to oscillate about a pivotal axis. By this simple mechanism for translating an oscillatory motion to the mirror 2 it is possible to use close tolerances, and this improves the uniformity of oscillation of the mirror 2 in that it tends to eliminate any jerky or uneven motion caused by play or loose connections in the translating mechanism.

The motor 13 may be fastened in a spring clamp 19 regulated by a screw 20 threaded in one end thereof, the clamp 19 being secured to a bracket 21 fastened in any suitable manner to the casing. By loosening the screw 20 the motor 13 may be turned in the clamp to change the position of the shaft of the disc 14 mounted thereon to adjust the amplitude and angles of oscillation of the mirror 2. The position of disc 14 with respect to the axis 18 determines the angle of mirror 2 at the center of the oscillation. As illustrated the motor is adjusted in the clamp with the disc 14 at the farthest possible point from the axis 18, which results in the smallest amplitude of oscillation by the fixed throw of the pin 15 which is shown eccentrically located in the disc 14. If the motor 13 is turned to the right in the clamp 19 the disc 14 will be raised and the mirror 2, as shown in Figs. 4 and 5, will be inclined rearwardly from the illustrated position at its center of oscillation. Also the distance between the center of the disc 14 and the axis of oscillation 17 will be shortened and the fixed throw of the pin 15 will consequently produce an increased amplitude of oscillation of the mirror 2. A light 22 mounted in the rear of the opaque mirror 2 is provided for illuminating the sign. It is preferable to have the motor 13 and the lamp 22 in the same electrical circuit, so that they are turned on and off simultaneously.

For the purpose of this description, the opaque mirror 2 may be assumed to be pivotly mounted on a horizontal axis, and the motor 13 oscillates the mirror about said axis. Normally none of the indicia 10 and 11 is visible from the front of the sign, but as the mirror 2 rotates, it changes its angular position relative to the mirror 1, and as the top of the mirror 2 moves towards the mirror 1, the indicia 10 become visible through the translucent mirror, and will remain visible for that portion of a cycle of oscillation required to rotate the mirror 2 to its extreme forward position and then rearwardly until it again reaches the position where the indicia 10 are no longer visible. As the bottom of the mirror 2 moves forwardly in the other half of the cycle of oscillation the indicia 11 then become visible from the front of the transparent mirror 1, and it is obvious that it will remain visible for substantially the same period of oscillation as in the case of indicia 10 in the first half of the cycle.

During the time the indicia 10 and 11 are caused to disappear and reappear, the indicia 12 are constantly visible; also reflections of objects in front of the transparent mirror 1 are constantly visible in the lower portion of the sign because of the permanent mirror effect produced by the unbroken portion of the opaque coating 8 of the mirror 2. It will therefore be seen that in the arrangement just described, one has the combination of disappearing and reappearing indicia with what may be termed permanent indicia, i. e., always visible during the oscillation of the opaque mirror 2. Further, a permanent mirror surface is effected on the transparent mirror 1 by the opaque coating 8 on the permanent mirror 2. Considering this arrangement as a basic combination, a large variety of novel effects may be produced by merely changing the location and/or application of the non-reflecting surface and the several sets of indicia with respect to the transparent mirror 1.

Figs. 2 and 3 illustrate one such modification, wherein all of the coating 6 of the cover glass 5 has been removed except a strip in the upper portion thereof. On the rear face of the cover glass 5, I provide indicia 23 in reverse form which do not extend beyond the upper edge of the opaque coating 6. Other indicia 24 are formed upon the rear surface of the mirror 2, said indicia being located within the lower edge of the coating 6. Still other indicia 25 are formed on the lower half of the mirror 2. To permit illumination of the indicia 23, a cut-out portion 26 is provided in the opaque mirror 2 through which light may pass from the lamp 22. If desired, still further indicia such as translucent indicia 40, may be formed on the front surface of the transparent mirror 1. These indicia may be located immediately in front of the opaque coating 6, in which event portions of the said coating corresponding to the indicia 40 are removed or cut out, and a transparent or translucent color applied to the cut-out portions. The general illumination of the sign by the lamp 22 will be sufficient to illuminate the indicia 40, but it will be understood that when the sign is not illuminated, the indicia will still be visible from the front, in the area or section comprising the apparent permanent mirror surface. It will be noted since Fig. 3 is a section taken on line 3—3 of Fig. 2, and includes a portion of Fig. 2 that has been broken away, the indicia 40 do not show in Fig. 2.

By this arrangement zones are created in which the several indicia appear on the transparent mirror 1, as indicated in Fig. 2. It will be noted that the strip of opaque coating 6 produces a permanent mirror surface. Adjacent thereto, at the top and bottom, the images of disappearing and reappearing indicia alternately become visible and invisible, while in the lower portion of the transparent mirror 1 the indicia 25 are constantly visible while the sign is illuminated.

Referring to Figs. 4 and 5, there is disclosed a sign of the class contemplated herein, applied to a wall cabinet having certain novel features of construction, as for example, locating the light source intermediate the transparent mirror 1 and the opaque mirror 2. The light source may comprise tubular lamps 31 suitably mounted in the top and bottom of the casing 30, which mounting may take the form of the well known clip terminals 32 which engage terminal members 33 on the ends of the tubular lamps 31.

In Fig. 4 it will be noted that the casing 30 fits flush with the wall, and a flange 34 is provided on the edges of the casing 30, to which may be secured a frame 35, by means of screws 29, for holding the transparent mirror 1 in position to close the open front of the casing 30. The mirror 1 abuts against an internal depending flange 36, thus limiting its movement rearwardly. It will be noted that the frame 35 is of sufficient width as to conceal the tubular lamps 31 when the sign is viewed from the front. It is also significant to note that by providing front lighting of the opaque mirror 2, the elements comprising the sign may be assembled very compactly, thus making it possible to economize on space, particularly in the depth of the casing 30, so that my sign is adapted for many purposes for which prior art signs of the class described are not applicable.

The opaque mirror 2 is pivotally mounted within the casing 30 by means of oppositely disposed support members 37 extending laterally from the rear wall of the casing (see Fig. 5) and adapted to engage pivot holes 18 of arms 38 rigidly secured to a suitable frame which carries the mirror 2. The motor 13 through its oscillating mechanism described heretofore, oscillates the opaque mirror 2.

It will be noted that another arrangement of the indicia is presented in this embodiment of the invention. Since the opaque mirror 2 is now illuminated from the front, whatever indicia are formed upon it must necessarily be on the front surface of said mirror. In the present instance the indicia 39 are located at the top and bottom marginal edges of the mirror 2, and may be applied directly without the necessity of removing any of the silver coating of the opaque mirror 2. The coating on the cover glass 5 is removed on that portion oppositely disposed to the indicia 39, and the central portion of the coating of the cover glass 5 may be left undisturbed, thus effecting a permanent mirror surface of the corresponding area on the transparent mirror 1. However, if desired, indicia 40 may be applied within the area of the apparent permanent mirror surface developed on the front face of the transparent mirror 1.

It will be appreciated that instead of providing a casing for the mirror system and associated parts a support or simple frame-work for carrying the mirrors would be equally satisfactory, and such a support could easily be suspended in a window or the like. If an open support were used, the motor and light source might be attached to same and suitable reflectors substituted for the internal reflecting surface of a casing, so that by using a skeletonized structure, an enclosure or casing might be dispensed with without sacrificing any of the features of the invention. Consequently, my invention in its broadest aspects contemplates such an arrangement as the equivalent of a casing.

From the foregoing description it is apparent that the inventive idea as disclosed herein is particularly adapted for use in animated multiple image signs having portions of the transparent mirror made opaque, or having indicia made to disappear and reappear by any of the methods described, or having a combination of any or all of these attention attracting features. By employing an opaque mirror as part of the transparent mirror element and having it face backwards with all of its reflective and protective backing removed except the portion which it is desired to utilize for a particular embodiment of the invention, the results obtainable are unique. The dark colored opaque mirror backing of the cover glass naturally makes that portion of the transparent mirror appear as an opaque mirror even though the sign is lighted. This same opaque mirror provides a rearwardly reflecting surface to take the place of the rearwardly reflecting portion of the transparent mirror which it covers up. By using this combination, the transparent mirror and cover glass present an unbroken reflecting surface in both directions, a portion being opaque and the rest transparent.

If indicia are located behind said opaque portion, whether applied to the rear surface of the transparent mirror and cover glass unit, or to the front surface of the rear opaque mirror, or as translucent indicia on the rear mirror, this indicia will be concealed in some central position of the moving mirror or mirrors. The described extension of the opposed reflecting surfaces produces the most effective moving multiple images when one or both of the mirrors is oscillated, permitting these multiple images to appear clearly beyond the area of the small opaque portion which is sufficient to conceal the original indicia.

Although changes may be made by those skilled in the art without departing from the spirit of my invention, nevertheless it is my desire to cover all such changes and modifications as come within the appended claims.

What is claimed is:

1. In a sign of the class described, a support, a front mirror unit and a rear mirror unit carried by said support and having spaced apart and opposed reflecting surfaces, said front mirror unit comprising a transparent mirror and an opaque mirror with their coated surfaces substantially in contact, a portion of the coating of said opaque mirror being removed to provide a transparent section thereof, indicia carried by one of said mirror units and concealed from front view by said opaque mirror, means for illuminating said indicia and means for imparting to one of said mirror units a periodic motion about an axis substantially parallel to the boundary between the transparent and opaque sections of said opaque mirror.

2. In a sign of the class described, a casing, a front mirror unit and a rear mirror unit supported in said casing and having spaced apart and opposed reflecting surfaces, said front mirror unit comprising a transparent mirror and an opaque mirror with their coated surfaces in closely adjacent and parallel planes, a portion of the coating of said opaque mirror being removed to provide a transparent section of said front mirror unit, indicia behind and opposed to the opaque section of said opaque mirror, means for illuminating said indicia and means for imparting to one of said mirror units a periodic motion whereby multireflected images of said indicia are periodically visible through the said transparent section of said front mirror unit.

3. In a sign of the class described, a support, a front mirror and a rear mirror carrier by the support and having opposed reflecting surfaces, said mirrors being spaced apart, a portion of said front mirror being transparent and another portion of said front mirror being opaque, both portions having a forwardly reflecting surface and a rearwardly reflecting surface, indicia on the said rearwardly reflecting surface of the opaque portion of said front mirror, means for illuminating the said indicia, and means for imparting a periodic motion to one of said mirrors whereby reflections of the said indicia are periodically visible through said transparent portion of the front mirror.

4. In a sign of the class described, a support, a front transparent mirror and a rear opaque mirror carried by the support, said mirrors being spaced apart and having opposed reflecting surfaces, an opaque reflecting surface opposing one of said reflecting surfaces and formed in spaced apart portions, two sets of translucent indicia forming part of the rear face of said opaque mirror and displaced with respect to said opaque reflecting surface, means for illuminating said indicia, and means for oscillating one of said mirrors, whereby the reflections of one set of said indicia will periodically disappear behind one portion of said opaque reflecting surface and the reflections of the other set of said indicia will appear from behind another portion of said opaque reflecting surface simultaneously with the disappearance of the first mentioned reflections when viewed from the front of the sign.

5. In a sign of the class described having a casing, a front transparent mirror and a rear opaque mirror supported in said casing, said mirrors being spaced apart and having opposed reflecting surfaces, means for causing a relative motion between said mirrors to cause the opposed reflecting surfaces of said mirrors to assume varying relative angular positions, said transparent mirror having its opposed reflecting surface diminished by an opaque reflecting surface interposed between said opposed reflecting surfaces, indicia carried by one of said mirrors and located behind said opaque reflecting surface and means for illuminating said indicia whereby reflectors of said indicia are made visible through said transparent mirror in certain of said relative angular positions of said reflecting surfaces.

6. In a sign of the class described having a casing, a mirror system comprising a front transparent mirror and a rear opaque mirror supported in said casing, said mirrors being spaced apart and having opposed reflecting surfaces, means for causing a relative periodic motion between said mirrors to cause the opposed reflecting surfaces of said mirrors to asume varying relative angular positions, light reflective indicia carried by the front mirror and light penetrable indicia carried by the rear mirror, means for illuminating both kinds of indicia, and means carried by the rear mirror and the casing for determining the relative periodic order of appearance through the transparent mirror of all reflections of said indicia.

7. In a sign of the class described having a casing, a non-transparent frame member forming the front of said casing and having a central opening, a front mirror unit forming a partly transparent closure for said opening and having a rearwardly reflecting surface, a rear mirror spaced apart from the said front mirror unit and pivotally supported within said casing, the entire reflecting surface of said rear mirror being opposed to the rearwardly reflecting surface of the front mirror unit, an electric motor supported within said casing forwardly of said rear mirror, the said motor being positioned behind said frame member and concealed thereby, transmitting means for oscillating said rear mirror by said motor, indicia applied to one of said opaque opposed reflecting surfaces and means for illuminating said indicia.

8. A sign as described in claim 7 in which the illuminating means are positioned behind said frame member and concealed thereby.

ERNEST CANTELO WHITE.